(12) United States Patent
Bennett

(10) Patent No.: US 7,495,857 B1
(45) Date of Patent: Feb. 24, 2009

(54) SERVO WRITING A DISK DRIVE BY WRITING SPIRAL TRACKS USING A MECHANICAL POSITION SENSOR

(75) Inventor: George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 336 days.

(21) Appl. No.: 11/322,907

(22) Filed: Dec. 30, 2005

(51) Int. Cl.
*G11B 21/02* (2006.01)
*G11B 5/596* (2006.01)

(52) U.S. Cl. .................. 360/75; 360/77.03; 360/78.11

(58) Field of Classification Search ...................... None
See application file for complete search history.

(56) References Cited

U.S. PATENT DOCUMENTS

| | | | |
|---|---|---|---|
| 3,806,254 A | 4/1974 | Ha et al. |
| 4,396,959 A | 8/1983 | Harrison et al. |
| 4,516,177 A | 5/1985 | Moon et al. |
| 4,967,291 A | 10/1990 | Touchton et al. |
| 4,974,109 A | 11/1990 | Hoshimi et al. |
| 5,227,930 A | 7/1993 | Thanos et al. |
| 5,270,886 A | 12/1993 | Nigam |
| 5,426,545 A | 6/1995 | Sidman et al. |
| 5,442,172 A | 8/1995 | Chiang et al. |
| 5,459,383 A | 10/1995 | Sidman et al. |
| 5,471,304 A | 11/1995 | Wang |
| 5,471,734 A | 12/1995 | Hatch et al. |
| 5,563,868 A | 10/1996 | Farnsworth et al. |
| 5,619,387 A | 4/1997 | Ottesen et al. |
| 5,666,236 A | 9/1997 | Bracken et al. |
| 5,828,508 A | 10/1998 | Whaley et al. |
| 5,831,786 A | 11/1998 | Boutaghou et al. |
| 5,856,895 A | 1/1999 | Schaenzer et al. |
| 5,909,333 A * | 6/1999 | Best et al. ..................... 360/51 |
| 6,052,250 A | 4/2000 | Golowka et al. |
| 6,054,833 A | 4/2000 | Takeuchi |
| 6,064,540 A | 5/2000 | Huang et al. |
| 6,072,655 A | 6/2000 | Uwabo et al. |
| 6,075,667 A | 6/2000 | Kisaka et al. |
| 6,100,623 A | 8/2000 | Huang et al. |
| 6,128,155 A | 10/2000 | Sugawara et al. |

(Continued)

OTHER PUBLICATIONS

Notice of Allowance dated Dec. 12, 2007 from U.S. Appl. No. 11/336,316, 9 pages.

(Continued)

*Primary Examiner*—K. Wong
(74) *Attorney, Agent, or Firm*—Howard H. Sheerin, Esq.

(57) ABSTRACT

A disk drive is disclosed including a disk, an actuator arm, a head attached to a distal end of the actuator arm, a mechanical position sensor operable to generate a position signal representing a position of the head relative to the disk, and a voice coil motor for rotating the actuator arm about a pivot. The disk is rotated at a predetermined velocity, a control signal is generated in response to the position signal generated by the mechanical position sensor, and the control signal is applied to the voice coil motor in order to seek the head radially over the disk while writing a spiral track to the disk. The spiral track is then processed to maintain the head along a servo track while writing product servo sectors along the servo track.

22 Claims, 16 Drawing Sheets

U.S. PATENT DOCUMENTS

| | | | |
|---|---|---|---|
| 6,157,522 A | 12/2000 | Murphy et al. | |
| 6,169,382 B1 | 1/2001 | McKenzie et al. | |
| 6,233,106 B1 | 5/2001 | Chambers | |
| 6,304,398 B1 | 10/2001 | Gaub et al. | |
| 6,307,702 B1 * | 10/2001 | Fukushi et al. | 360/75 |
| 6,310,746 B1 | 10/2001 | Hawwa et al. | |
| 6,396,652 B1 | 5/2002 | Kawachi et al. | |
| 6,407,876 B1 | 6/2002 | Yamaguchi et al. | |
| 6,407,877 B1 | 6/2002 | Mitani | |
| 6,493,170 B1 * | 12/2002 | Kato et al. | 360/75 |
| 6,515,834 B1 | 2/2003 | Murphy | |
| 6,535,347 B1 | 3/2003 | Wakuda | |
| 6,542,326 B1 | 4/2003 | Ell et al. | |
| 6,563,660 B1 | 5/2003 | Hirano et al. | |
| 6,583,948 B1 | 6/2003 | Taniguchi | |
| 6,583,964 B1 | 6/2003 | Huang et al. | |
| 6,603,629 B1 | 8/2003 | Tsai | |
| 6,604,431 B1 | 8/2003 | Soga et al. | |
| 6,614,613 B1 | 9/2003 | Huang et al. | |
| 6,618,217 B2 | 9/2003 | Heaton et al. | |
| 6,618,218 B1 | 9/2003 | Kadowaki et al. | |
| 6,621,653 B1 | 9/2003 | Schirle | |
| 6,624,983 B1 | 9/2003 | Berding | |
| 6,631,047 B2 | 10/2003 | Ishizuka et al. | |
| 6,674,600 B1 | 1/2004 | Codilian et al. | |
| 6,690,551 B2 | 2/2004 | Shiraishi et al. | |
| 6,697,211 B2 | 2/2004 | Koganezawa | |
| 6,707,632 B1 | 3/2004 | Raphael et al. | |
| 6,747,834 B1 | 6/2004 | Matsuyama | |
| 6,781,778 B1 | 8/2004 | Molstad et al. | |
| 6,791,784 B2 | 9/2004 | Edwards | |
| 6,798,609 B1 | 9/2004 | Bonin et al. | |
| 6,816,334 B2 | 11/2004 | Watanabe et al. | |
| 6,829,118 B1 | 12/2004 | Takamiya et al. | |
| 6,831,808 B2 | 12/2004 | Ottesen et al. | |
| 6,888,694 B2 | 5/2005 | Guo et al. | |
| 6,914,745 B2 | 7/2005 | Takeuchi et al. | |
| 6,924,958 B2 | 8/2005 | Vigna et al. | |
| 6,934,117 B2 | 8/2005 | Huang et al. | |
| 6,943,978 B1 * | 9/2005 | Lee | 360/75 |
| 7,002,771 B2 | 2/2006 | Christie, Jr. et al. | |
| 7,019,938 B2 | 3/2006 | Miyata et al. | |
| 7,154,689 B1 | 12/2006 | Shepherd et al. | |
| 7,170,705 B2 | 1/2007 | Shimizu et al. | |
| 7,209,311 B2 | 4/2007 | Ueda et al. | |
| 7,215,504 B1 | 5/2007 | Bennett | |
| 7,365,932 B1 | 4/2008 | Bennett | |
| 2002/0054451 A1 | 5/2002 | Moon et al. | |
| 2002/0109931 A1 | 8/2002 | Vigna et al. | |
| 2003/0053244 A1 | 3/2003 | Lewis | |
| 2003/0133219 A1 | 7/2003 | Ishizuka et al. | |
| 2003/0147181 A1 | 8/2003 | Shiraishi et al. | |
| 2004/0001280 A1 | 1/2004 | Ikedo et al. | |
| 2004/0051993 A1 | 3/2004 | Shin | |
| 2004/0246833 A1 | 12/2004 | Ehrlich | |
| 2006/0119977 A1 | 6/2006 | Zhu et al. | |

OTHER PUBLICATIONS

Notice of Allowance dated Dec. 13, 2007 from U.S. Appl. No. 11/323,251, 12 pages.

UDT Sensors Inc., "Non-contact optical position sensing using silicon photodetectors", App Note No. 13, Apr. 1982, http://www.udt.com.

M. Kobayashi et al., "Multi-Sensing Servo with Carriage-Acceleration Feedback for Magnetic Disk Drives", Proceedings of the American Control Conference, Jun. 1998, pp. 3038-3042.

F. Y. Huang et al., "Active Damping in HDD Actuator", IEEE Transactions on Magnetics, vol. 37, No. 2, Mar. 2001, pp. 847-849.

Office Action dated Jul. 20 , 2007, from U.S. Appl. No. 11/336,316, 7 pages.

Office Action dated Jan. 9, 2007 from U.S. Appl. No. 11/323,251, 14 pages.

Notice of Allowance dated Jul. 10, 2007 from U.S. Appl. No. 11/323,251, 8 pages.

Office Action dated Sep. 21, 2006 from U.S. Appl. No. 11/253,400, 15 pages.

Notice of Allowance dated Jan. 24, 2007 from U.S. Appl. No. 11/253,400, 6 pages.

Office Action dated May 8, 2007 from U.S. Appl. No. 11/336,316, 15 pages.

Office Action dated Oct. 30, 2008 from U.S. Appl. No. 11/322,908, 18 pages.

Notice of Allowance dated Aug. 27, 2008, from U.S. Appl. No. 11/336,316, 6 pages.

Office Action dated Apr. 15, 2008 from U.S. Appl. No. 11/322,908, 32 pages.

Notice of Allowance dated Apr. 18, 2008 from U.S. Appl. No. 11/336,316, 8 pages.

* cited by examiner

SERVO WRITING A DISK DRIVE BY WRITING SPIRAL TRACKS USING A MECHANICAL POSITION SENSOR

BACKGROUND OF THE INVENTION

1. Field of the Invention

The present invention relates to disk drives for computer systems. More particularly, the present invention relates to servo writing a disk drive by writing spiral tracks using a mechanical position sensor.

2. Description of the Prior Art

FIG. 1 shows an exploded view of a prior art disk drive comprising a disk 2 rotated by a spindle motor 4, and a head 6 coupled to a distal end of an actuator arm 8 which is rotated about a pivot 10 by a voice coil motor (VCM) in order to actuate the head 6 over the disk 2. The disk 2, spindle motor 4, head 6, actuator arm 8, and VCM are enclosed in a head disk assembly (HDA) comprising a base 9 and a cover 11. The VCM comprises a voice coil 12 coupled to the base of the actuator arm 8 and one or more permanent magnets attached to a yoke 14. When the voice coil 12 is energized with current, the resulting magnetic flux interacts with the magnetic flux of the permanent magnets to generate a torque that rotates the actuator arm 8 about the pivot 10. A tang 16 attached to the actuator arm 8 interacts with a crash stop 18 to limit the stroke of the actuator arm 8, and also provides a latching mechanism (e.g., using a magnet) to maintain the actuator arm 8 in a latched position while the disk drive is powered down. Alternatively, the actuator arm 8 may be parked on a ramp located at the outer periphery of the disk 2 when the disk drive is powered down.

Servo sectors $21_0$-$21_N$ are written to the disk 2 to define a plurality of radially spaced, concentric servo tracks 23 as shown in the prior art disk format of FIG. 2. A plurality of data tracks are defined relative to the servo tracks 23, wherein each data track is partitioned into a plurality of data sectors with embedded servo sectors $21_0$-$21_N$. Each servo sector (e.g., servo sector $21_4$) comprises a preamble 25 for synchronizing gain control and timing recovery, a sync mark 27 for synchronizing to a data field 29 comprising coarse head positioning information such as a track number, and servo bursts 31 which provide fine head positioning information. The coarse head position information is processed to position a head over a target track during a seek operation, and the servo bursts 31 are processed to maintain the head over a centerline of the target track while writing or reading data during a tracking operation.

In the past, external servo writers have been used to write the product servo sectors $21_0$-$21_N$ to the disk surface during manufacturing. External servo writers employ extremely accurate head positioning mechanics, such as a laser interferometer, to ensure the product servo sectors $21_0$-$21_N$ are written at the proper radial location from the outer diameter of the disk to the inner diameter of the disk. However, external servo writers are expensive and require a clean room environment so that a head positioning pin can be inserted into the HDA without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. In one prior art technique, a self-servo writing operation is performed by writing a plurality of spiral tracks to the disk which are then processed to write the product servo sectors along a circular path. The spiral tracks are written "open loop" by seeking the head from an outer diameter of the disk to an inner diameter of the disk. The disk drive calibrates acceleration/deceleration impulses to seek the head from the outer to inner diameter in a desired amount of time. Accurate radial positioning of the spiral tracks assumes the calibration process is accurate and that the calibrated acceleration/deceleration impulses will generate a repeatable response over multiple seeks. However, the calibration process will inevitably exhibit some degree of error, and the dynamics of the disk drive will change between seeks inducing errors in the radial position of the spiral tracks. Dynamic errors which degrade the spiral tracks written during an open loop seek include vibration of the HDA, flutter and non-repeatable run-out of the disk and spindle bearings, stiction and non-repeatable run-out of the pivot bearings, windage on the head and arm, and flex circuit bias, windage and vibration. Errors in writing the spiral tracks will propagate to the product servo sectors, thereby degrading the operating performance of the disk drive and reducing the manufacturing yield.

There is, therefore, a need to improve the servo writing process for a disk drive by reducing the bottleneck and expense of external servo writers while maintaining adequate operating performance and manufacturing yield.

SUMMARY OF THE INVENTION

An embodiment of the present invention comprises a disk drive including a disk, an actuator arm, a head attached to a distal end of the actuator arm, a mechanical position sensor operable to generate a position signal representing a position of the head relative to the disk, and a voice coil motor for rotating the actuator arm about a pivot. The disk is rotated at a predetermined velocity, a control signal is generated in response to the position signal generated by the mechanical position sensor, and the control signal is applied to the voice coil motor in order to seek the head radially over the disk while writing a spiral track to the disk. The spiral track is then processed to maintain the head along a servo track while writing product servo sectors along the servo track.

In one embodiment, the spiral track comprises a high frequency signal interrupted at a periodic interval by a sync mark.

In another embodiment, a plurality of spiral tracks are written to the disk by seeking the head radially over the disk a number of times and writing one of the spiral tracks during each seek.

In yet another embodiment, the disk comprises a clock track for synchronizing a write clock, and the write clock is processed while writing the spiral track to the disk. In one embodiment, the disk drive further comprises a clock head for reading the clock track to synchronize the write clock.

In still another embodiment, the disk further comprises a first plurality of reference tracks written at an outer diameter of the disk and a second plurality of reference tracks written at an inner diameter of the disk, and the mechanical position sensor is calibrated by reading the first and second plurality of reference tracks. In one embodiment, at least one of a gain and an offset of the mechanical position sensor is calibrated by reading the first and second plurality of reference tracks, and in another embodiment, a reference position is determined representing a radial position of at least one of the first and second plurality of reference tracks. In another embodiment, the head seeks from a first diameter of the disk to a second diameter of the disk while writing the spiral track by positioning the head near the first diameter of the disk by reading at least one of the first and second plurality of reference tracks, and seeking the head toward the second diameter of the disk. In yet another embodiment, the head seeks toward the second diameter of the disk in response to a predetermined velocity seek profile, and at least one of the gain and offset of the mechanical position sensor is calibrated by reading at least one of the first and second plurality of reference tracks after seeking the head toward the second diameter of the disk.

In one embodiment, the mechanical position sensor comprises an optical sensor.

Another embodiment of the present invention comprises a method of servo writing a disk drive, the disk drive comprising a disk, an actuator arm, a head attached to a distal end of the actuator arm, a mechanical position sensor operable to generate a position signal representing a position of the head relative to the disk, and a voice coil motor for rotating the actuator arm about a pivot. The disk is rotated at a predetermined velocity, a control signal is generated in response to the position signal generated by the mechanical position sensor, and the control signal is applied to the voice coil motor in order to seek the head radially over the disk while writing a spiral track to the disk. The spiral track is then processed to maintain the head along a servo track while writing product servo sectors along the servo track.

DESCRIPTION OF THE PREFERRED EMBODIMENTS

Figure 3:
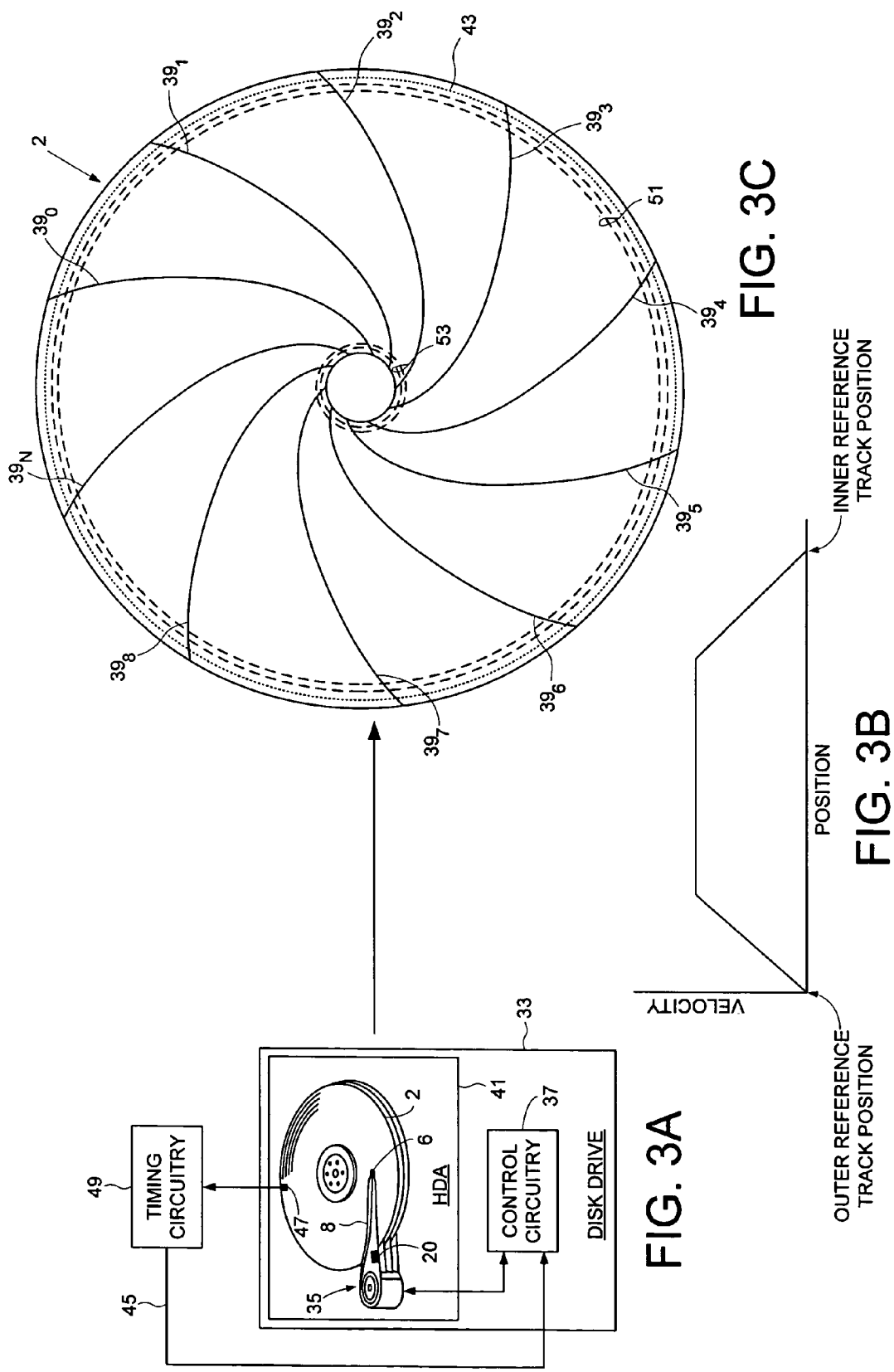
FIG. 3A shows a disk drive according to an embodiment of the present invention including a mechanical position sensor used to write spiral tracks to the disk.
FIG. 3B is a velocity seek profile for seeking the head radially over the disk while writing a spiral track according to an embodiment of the present invention.
FIG. 3C shows a disk according to an embodiment of the present invention comprising a plurality of reference tracks at the outer diameter and inner diameter for use in calibrating the mechanical position sensor.

FIG. 3A shows a disk drive 33 according to an embodiment of the present invention including a disk 2, an actuator arm 8, a head 6 attached to a distal end of the actuator arm 8, a mechanical position sensor 20 operable to generate a position signal representing a position of the head 6 relative to the disk 2, and a voice coil motor 35 for rotating the actuator arm 8 about a pivot. Control circuitry 37 rotates the disk 2 at a predetermined velocity, generates a control signal in response to the position signal generated by the mechanical position sensor 20, and applies the control signal to the voice coil motor 35 in order to seek the head 6 radially over the disk 2 while writing a spiral track $39_i$ to the disk 2 (FIG. 3C). The control circuitry 37 then processes the spiral track $39_i$ to maintain the head 6 along a servo track while writing product servo sectors $21_0$-$21_N$ along the servo track.

Any suitable control signal may be applied to the voice coil motor 35 in response to the position signal generated by the mechanical position sensor 20. In one embodiment, a velocity of the voice coil motor 35 is estimated in response to the position signal and compared to a target velocity in a velocity seek profile (FIG. 3B). The error between the estimated velocity and target velocity is used to generate the control signal applied to the voice coil motor 35 in order to drive the error toward zero using any suitable servo compensation technique.

In the embodiment of FIG. 3A, the disk 2, head 6, actuator arm 8, and voice coil motor 35 are enclosed in a head disk assembly (HDA) 41, wherein the control circuitry 37 is mounted on a printed circuit board coupled to the HDA 41. In one embodiment, the mechanical position sensor 20 is also completely enclosed in the HDA 41, and in an alternative embodiment, all or part of the mechanical position sensor 20 is located outside of the HDA 41 wherein the HDA 41 comprises suitable access (e.g., a window) to facilitate operation of the mechanical position sensor 20.

Figure 4:
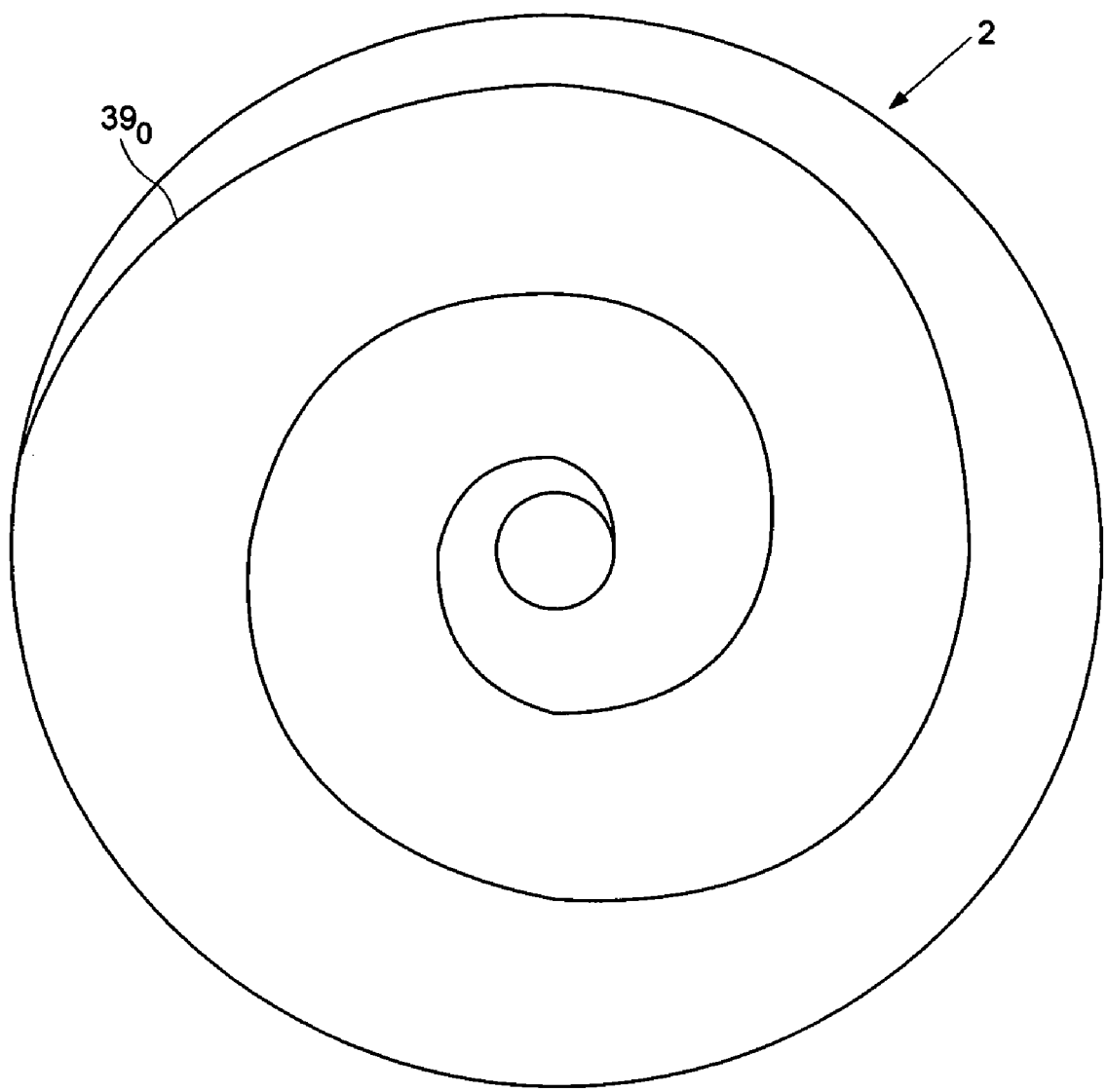
FIG. 4 illustrates an embodiment of the present invention wherein each spiral track is written over multiple revolutions of the disk.

In one embodiment, the control circuitry 37 writes a plurality of spiral tracks $39_0$-$39_N$ to the disk 2 by seeking the head 6 radially over the disk 2 a number of times and writing one of the spiral tracks $39_i$ during each seek as illustrated in FIG. 3C. In the embodiment shown in FIG. 3C, the control circuitry 37 writes each spiral track $39_i$ over a partial revolution of the disk 2. In an alternative embodiment shown in FIG. 4, the control circuitry 37 writes each spiral track (e.g., spiral track $39_0$) over multiple revolutions of the disk 2.

Referring again to FIG. 3C, in one embodiment the disk 2 comprises a clock track 43 for synchronizing a write clock 45, wherein the control circuitry 37 processes the write clock 45 while writing the spiral tracks to the disk 2. In the embodiment of FIG. 3A, the HDA 41 comprises a suitable aperture for inserting an external clock head 47, as well as external timing circuitry 49 for processing the read signal from the clock head 47 to synchronize the write clock 45. In an alternative embodiment, the clock head 47 and timing circuitry 49 are integrated into the disk drive 33. For example, the clock head 47 may be attached to a distal end of a fixed arm attached to a cover of the HDA 41, and the timing circuitry 49 may be integrated with the control circuitry 37. In one embodiment, the clock track 43 is written to the disk 2 using an external servo writer or media writer, and in an alternative embodiment, the clock track 43 is written to the disk 2 using the circuitry internal to the disk drive 33.

In the embodiment of FIG. 3C, the disk 2 further comprises a first plurality of reference tracks 51 written at an outer diameter of the disk 2 and a second plurality of reference tracks 53 written at an inner diameter of the disk 2, wherein the control circuitry 37 calibrates the mechanical position sensor 20 by reading the first and second plurality of reference tracks. In one embodiment, the control circuitry 37 calibrates at least one of a gain and an offset of the mechanical position sensor 20. In one embodiment, the reference tracks 51 and 53 are written to the disk 2 using an external servo writer or a media writer, which may also write a number of reference tracks at different radial locations across the disk surface to facilitate calibrating the mechanical position sensor 20. This embodiment may improve performance if the transfer function of the mechanical position sensor 20 is more complex than a simple linear function.

Figure 5A:
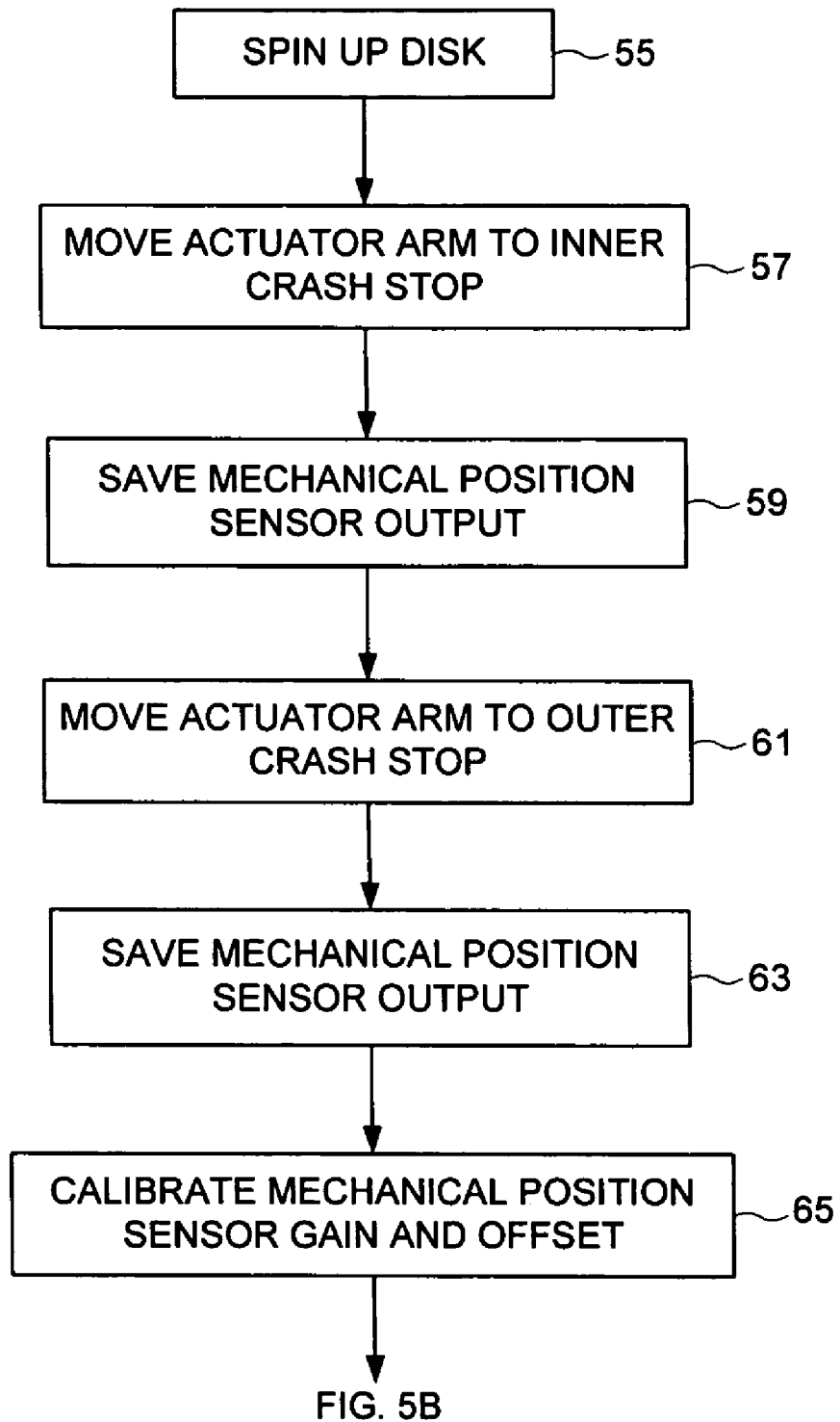
FIG. 5A is a flow diagram for calibrating the mechanical position sensor using the inner and outer crash stops according to an embodiment of the present invention.
Figure 5B:
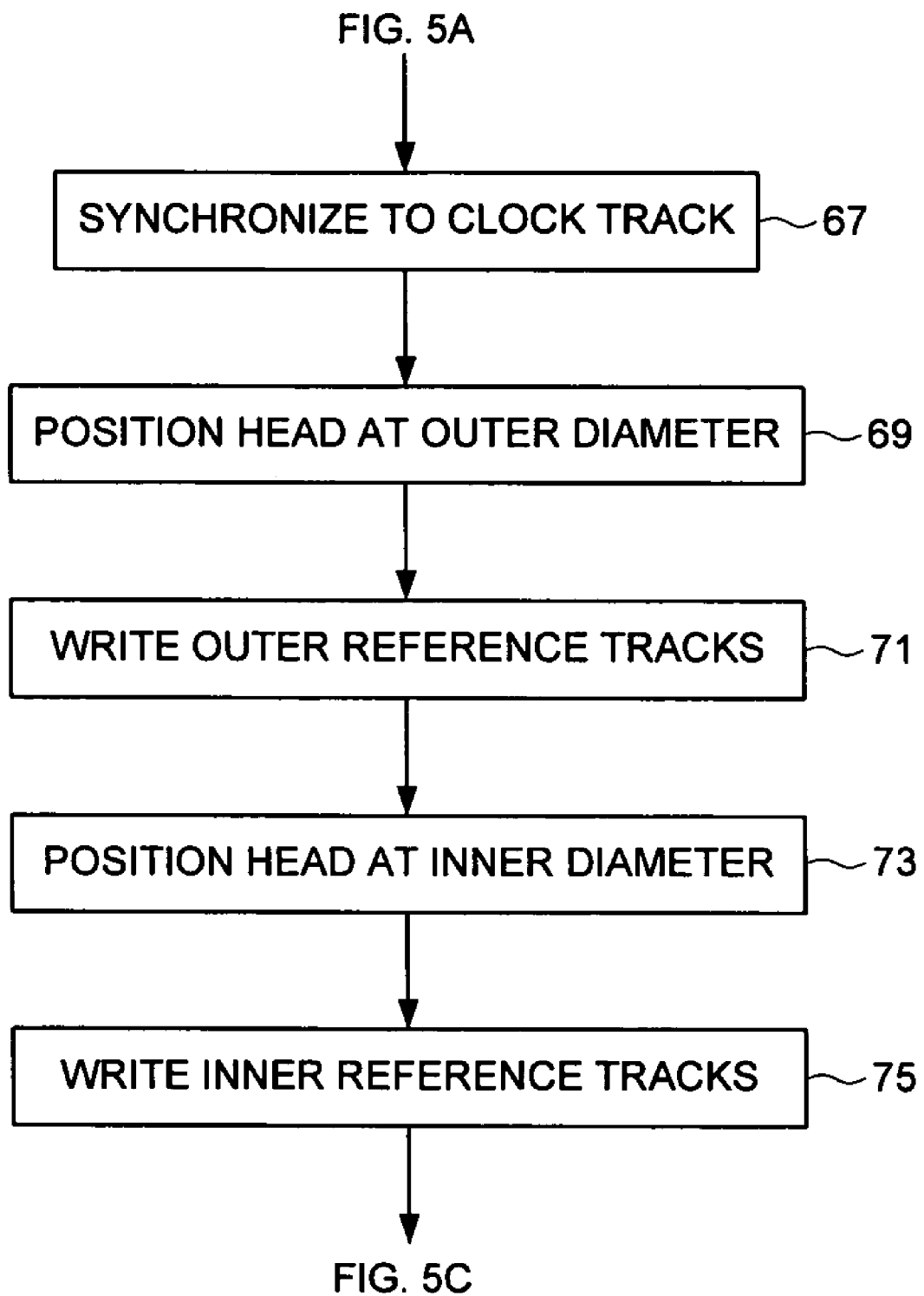
FIG. 5B is a flow diagram according to an embodiment of the present invention for writing reference tracks at the inner and outer diameter of the disk for use in writing the spiral tracks to the disk.

In another embodiment, control circuitry 37 writes the reference tracks 51 and 53 internally by executing the flow diagram of FIGS. 5A and 5B. At step 55 the control circuitry 37 spins up the disk 2, at step 57 moves the actuator arm 8 until it engages an inner crash stop and at step 59 saves the output position signal of the mechanical position sensor 20 (or a representation thereof). At step 61, the control circuitry 37 moves the actuator arm 8 to an outer crash stop and saves the output position signal of the mechanical position sensor 20 at step 63. At step 65 the control circuitry 37 calibrates the gain and offset of the mechanical position sensor 20 by evaluating the sensor outputs saved at steps 59 and 63.

Once the gain and offset of the mechanical position sensor 20 have been calibrated, the control circuitry 37 writes the reference tracks 51 and 53 to the disk 2 by executing the flow diagram of FIG. 5B, wherein at step 67 the timing circuitry 49 synchronizes the write clock 45 to the clock track 43. At step 69, the control circuitry 37 uses the mechanical position sensor 20 to position the head 6 at an outer diameter of the disk 2, and at step 71 writes the first plurality of reference tracks 51. At step 73, the control circuitry 37 uses the mechanical position sensor 20 to position the head 6 at an inner diameter of the disk 2, and at step 75 writes the second plurality of reference tracks 53. In one embodiment, the control circuitry 37 attempts to read the reference tracks 51 and 53 to verify recoverability. If either of the reference tracks 51 or 53 cannot be recovered, the control circuitry 37 rewrites the reference tracks with a suitable offset (e.g., toward a middle diameter of the disk 2) and repeats the process until the reference tracks can be recovered reliably. The control circuitry 37 then saves the output position signals of the mechanical position sensor 20 as a reference position for the reference tracks 51 and 53 used to write the spiral tracks $39_0$-$39_N$ to the disk 2.

Figure 5C:
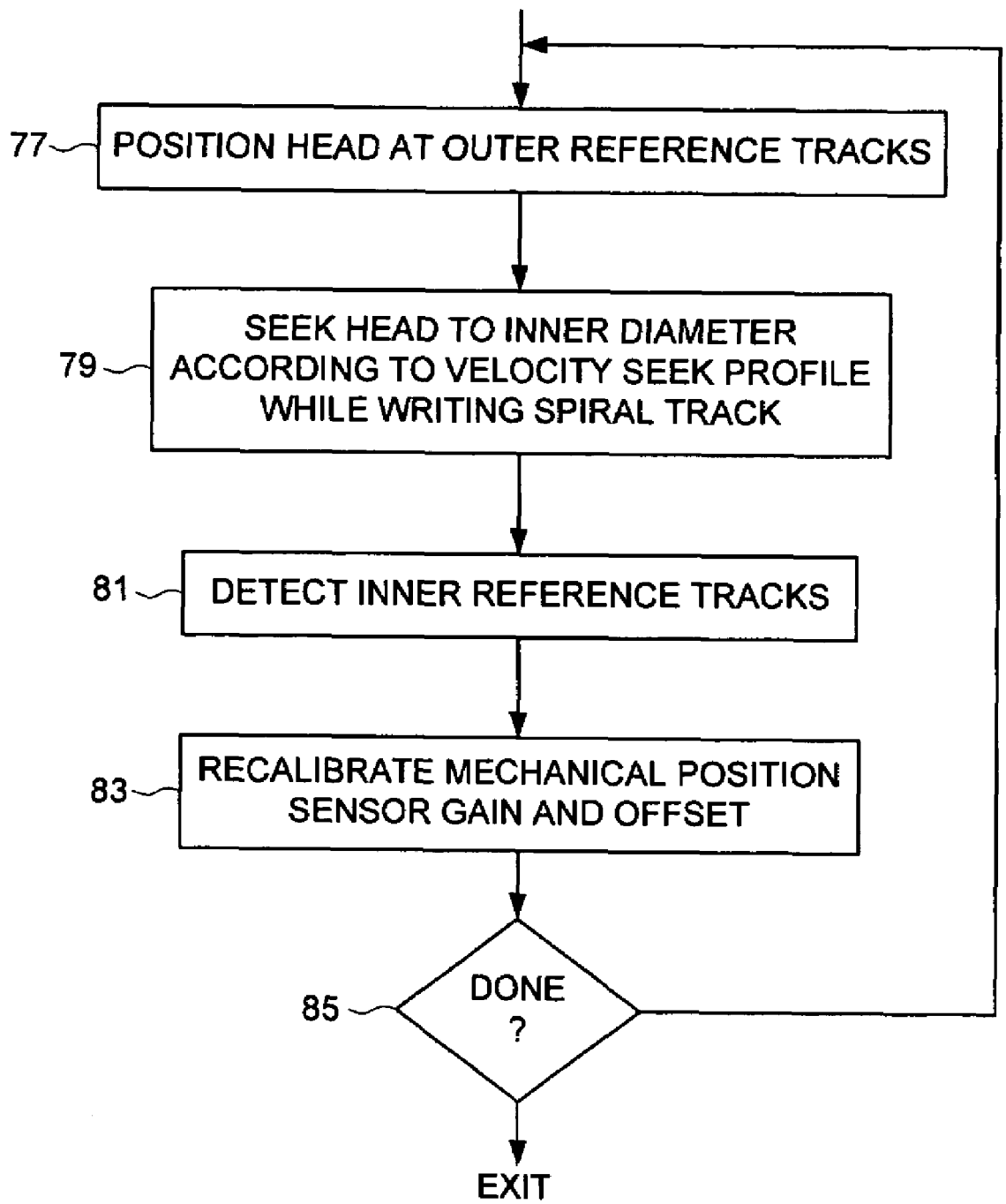
FIG. 5C is a flow diagram according to an embodiment of the present invention for writing the spiral tracks to the disk over multiple seeks, wherein the mechanical position sensor is recalibrated after each seek.

FIG. 5C is a flow diagram executed by the control circuitry 37 for writing the spiral tracks $39_0$-$39_N$ to the disk 2 using the reference tracks 51 and 53. At step 77, the control circuitry 37 positions the head 6 at the outer reference tracks 51 by detecting when the position signal from the mechanical position sensor 20 equals the saved reference position for the outer reference tracks 51, and then reads the outer reference tracks 51 using the head 6 to verify the head 6 is actually over the outer reference tracks 51. At step 79 the control circuitry 37 uses the mechanical position sensor 20 to seek the head 6 toward the inner diameter of the disk in response to a predetermined velocity seek profile (FIG. 3B) while writing one of the spiral tracks $39_i$ to the disk 2. The write clock (synchronized to the clock track 43) enables the spiral track writing at the appropriate circumferential location, and helps set the frequency of the pattern and embedded sync marks within the spiral track $39_i$ as it is written to the disk. At step 81, the control circuitry 37 attempts to read the inner reference tracks 53 using the head 6 when the mechanical position sensor 20 indicates the head 6 has reached the inner reference tracks 53 (i.e., when the output of the mechanical position sensor 20 equals the saved reference position for the inner reference tracks 53). In one embodiment, the control circuitry 37 attempts to seek to a middle one of the inner reference tracks 53. If there is an error between the actual inner reference track detected (i.e., read) and the output position signal of the mechanical position sensor 20, then at step 83 the control circuitry 37 recalibrates at least one of the gain and offset of the mechanical position sensor 20. This calibration procedure may include the step of seeking the head 6 back to the outer reference tracks 51 and comparing the position signal generated by the mechanical position sensor 20 to the position detected by reading one of the outer reference tracks. A drift in the offset or gain may occur due to a drift in the mechanical/electrical components of the mechanical position sensor 20, or a drift in the mechanical/electrical components of the disk drive, such as the disk 2 expanding due to temperature fluctuations. The control circuitry 37 re-executes the flow diagram of FIG. 5C to write the next spiral track to the disk 2, until at step 85 all of the spiral tracks have been written.

Any suitable control circuitry 37 may be employed to implement the described embodiments of the present invention. In one embodiment, the control circuitry 37 comprises a microprocessor executing instructions, the instructions being operable to cause the microprocessor to perform the steps of FIGS. 5A-5C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 37 comprises suitable logic circuitry, such as state machine circuitry.

Figure 6A:
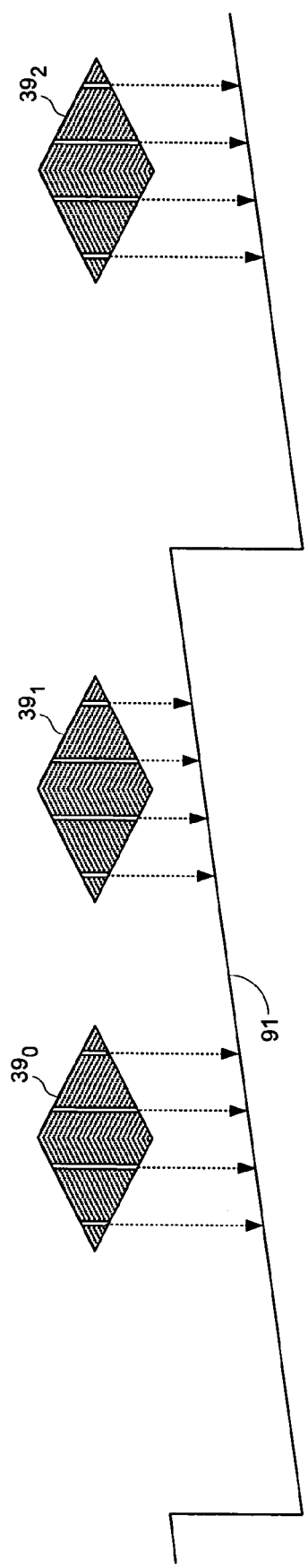
FIG. 6A shows an embodiment of the present invention wherein a servo write clock is synchronized by clocking a modulo-N counter relative to when the sync marks in the spiral tracks are detected.
Figure 6B:
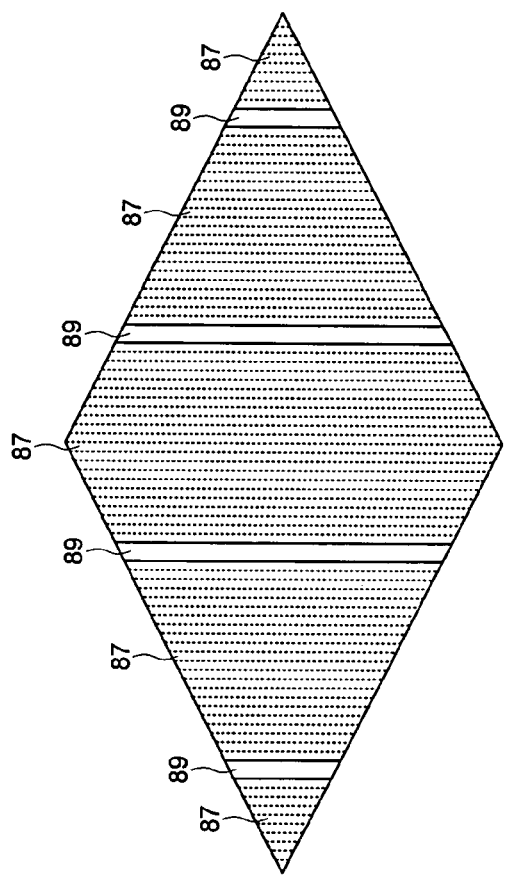
FIG. 6B shows an eye pattern generated by reading the spiral track, including the sync marks in the spiral track.

In one embodiment, each spiral track $39_i$ comprises a high frequency signal interrupted at a periodic interval by a sync mark such that when the head 6 passes over a spiral track $39_i$, the resulting read signal forms an "eye" pattern having high frequency transitions 87 interrupted by sync marks 89 as illustrated in FIG. 6B. When the head 6 moves in the radial direction, the eye pattern will shift (left or right) while the sync marks 89 remain fixed. The shift in the eye pattern (detected from the high frequency signal 87) relative to the sync marks 89 provides the off-track information (position error signal or PES) for servoing the head 6 (to track, for example, servo tracks or data tracks).

FIG. 6A shows an embodiment of the present invention wherein a saw-tooth waveform 91 is generated by clocking a modulo-N counter with a servo write clock, wherein the frequency of the servo write clock is adjusted until the sync marks 89 in the spiral tracks $39_0$-$39_N$ are detected at a target modulo-N count value. The servo write clock may be generated using any suitable circuitry, such as a phase locked loop (PLL). As each sync mark 89 in the spiral tracks $39_0$-$39_N$ is detected, the value of the modulo-N counter represents the phase error for adjusting the PLL. In one embodiment, the PLL is updated when any one of the sync marks 89 within the eye pattern is detected. In this manner the multiple sync marks 89 in each eye pattern (each spiral track crossing) provides redundancy so that the PLL is still updated if one or more of the sync marks 89 are missed due to noise in the read signal. Once the sync marks 89 are detected at the target modulo-N counter values, the servo write clock is coarsely locked to the desired frequency for writing the product servo sectors $21_0$-$21_N$ to the disk 2.

Figure 1:
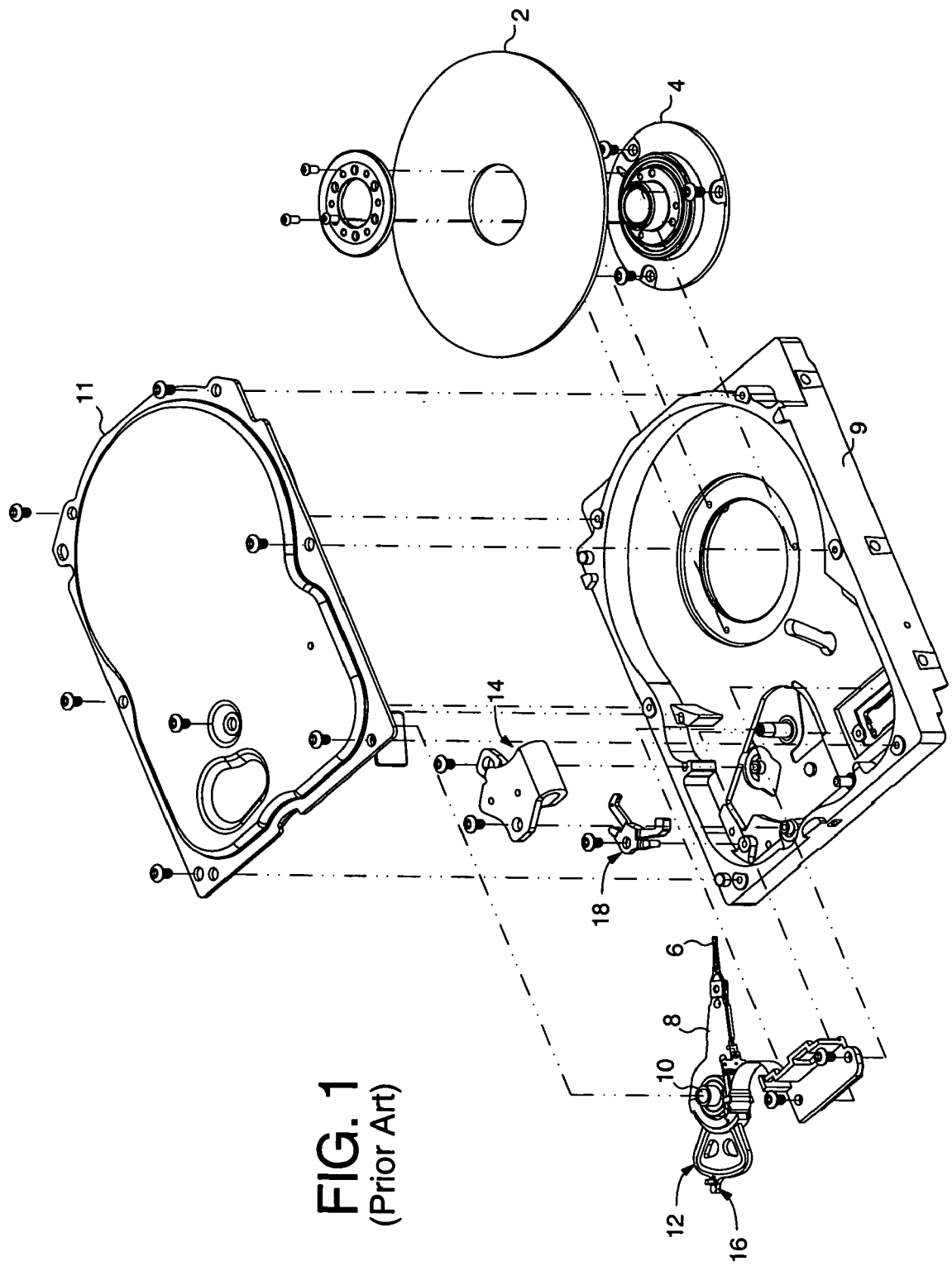
FIG. 1 shows a prior art disk drive comprising a disk, a head attached to an actuator arm, and a voice coil motor for rotating the actuator arm about a pivot in order to position the head over the disk.
Figure 2:
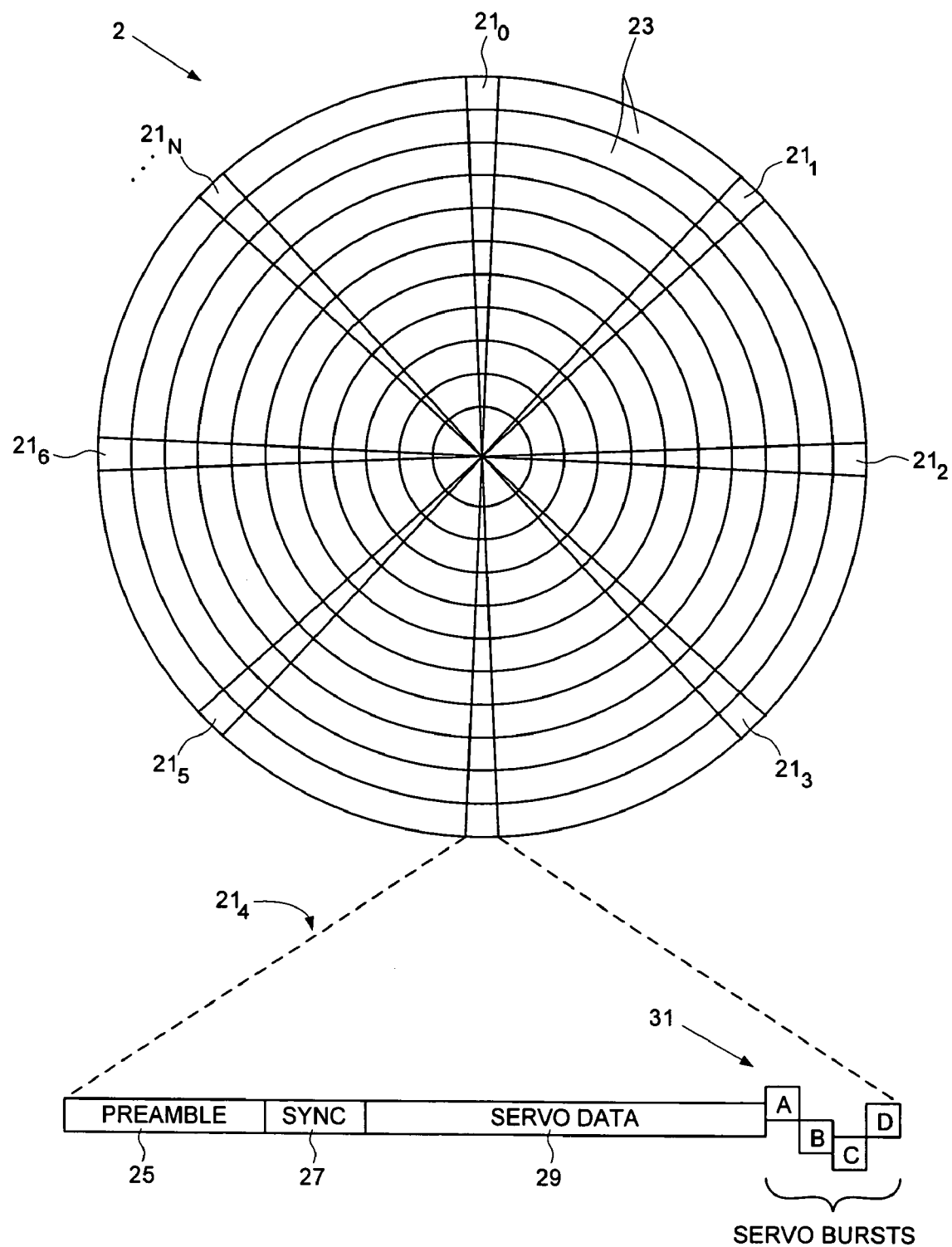
FIG. 2 shows a prior art format of a disk having a plurality of product servo sectors comprising servo information, the product servo sectors defining a plurality of servo tracks.

The sync marks 89 in the spiral tracks $39_0$-$39_N$ may comprise any suitable pattern, and in one embodiment, a pattern that is substantially shorter than the sync mark 27 in the conventional product servo sectors 21 of FIG. 2. A shorter sync mark 89 allows the spiral tracks $39_0$-$39_N$ to be written to the disk 2 using a steeper slope (by moving the head 6 faster from the outer diameter to the inner diameter of the disk 2) which reduces the time required to write each spiral track $39_0$-$39_N$.

In one embodiment, the servo write clock is further synchronized by generating a timing recovery measurement from the high frequency signal 87 between the sync marks 89 in the spiral tracks $39_0$-$39_N$. Synchronizing the servo write clock to the high frequency signal 87 helps maintain proper radial alignment (phase coherency) of the Gray coded track addresses in the product servo sectors. The timing recovery measurement may be generated in any suitable manner. In one embodiment, the servo write clock is used to sample the high frequency signal 87, and the signal sample values are processed to generate the timing recovery measurement. The timing recovery measurement adjusts the phase of the servo write clock (e.g., by a PLL) so that the high frequency signal 87 is sampled synchronously. In this manner, the sync marks 89 provide a coarse timing recovery measurement, and the high frequency signal 87 provides a fine timing recovery measurement for maintaining synchronization of the servo write clock.

Figure 7:
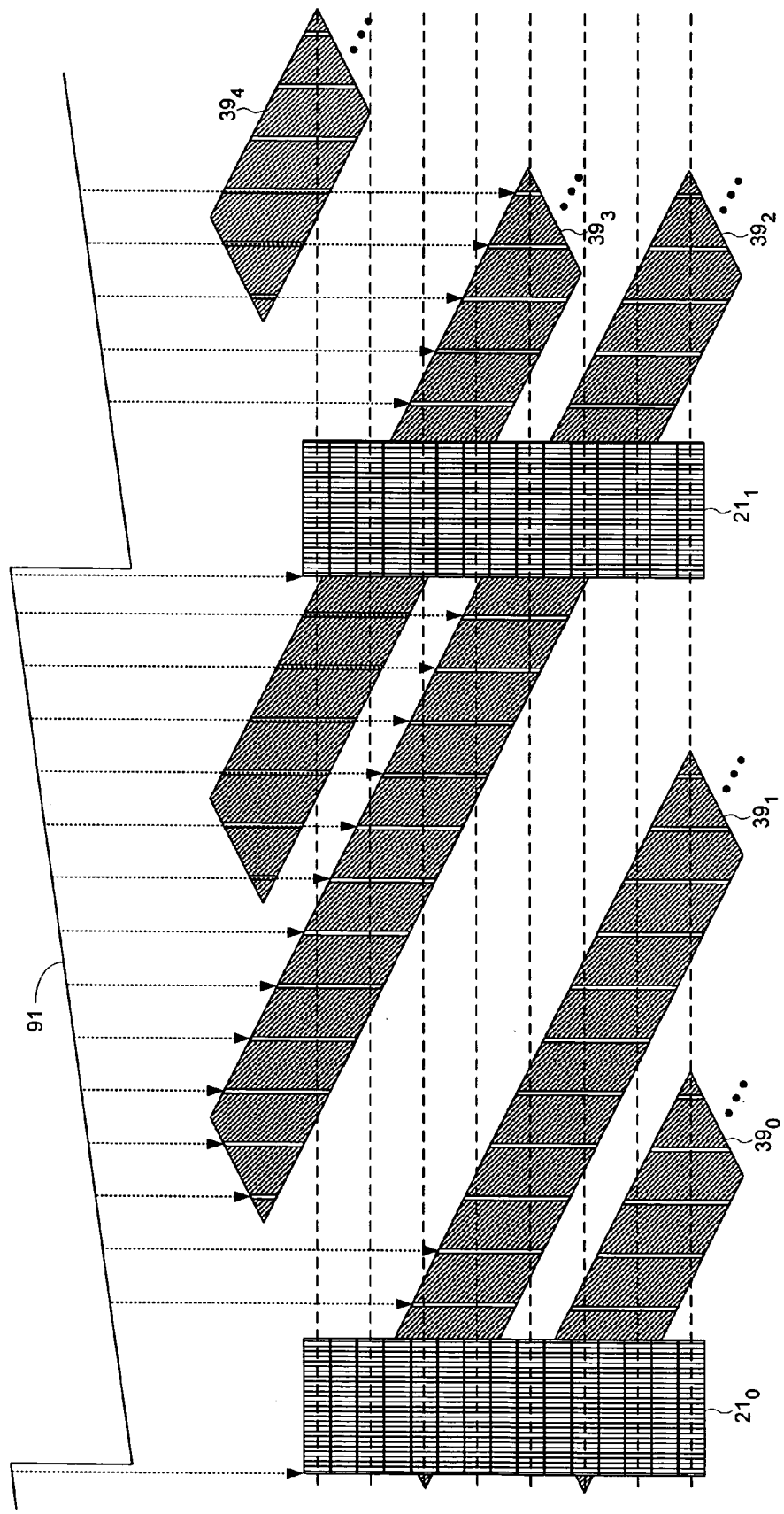
FIG. 7 illustrates writing of product servo sectors using a servo write clock generated from reading the spiral tracks.

FIG. 7 illustrates how the product servo sectors $21_0$-$21_N$ are written to the disk 2 after synchronizing the servo write clock in response to the high frequency signal 87 and the sync marks 89 in the spiral tracks $39_0$-$39_N$. In the embodiment of FIG. 7, the dashed lines represent the centerlines of the data tracks. The sync marks in the spiral tracks $39_0$-$39_N$ are written so that there is a shift of two sync marks 89 in the eye pattern (FIG. 6B) between data tracks. In an alternative embodiment, the sync marks 89 in the spiral tracks $39_0$-$39_N$ may be written so that there is a shift of N sync marks in the eye pattern between data tracks. Alternatively, the sync marks 89 may be written so that there is a shift of N sync marks in the eye pattern between servo tracks. In the embodiment of FIG. 7, the data tracks are narrower than the spiral tracks 39; however, in an alternative embodiment the data tracks may be wider than or proximate the width of the spiral tracks 39.

Once the head 6 is tracking on a servo track, the product servo sectors $21_0$-$21_N$ are written to the disk 2 using the servo write clock. Write circuitry is enabled when the modulo-N counter reaches a predetermined value, wherein the servo write clock clocks the write circuitry to write the product servo sector 21 to the disk. The spiral tracks $39_0$-$39_N$ on the disk are processed in an interleaved manner to account for the product servo sectors $21_0$-$21_N$ overwriting a spiral track. For example, when writing the product servo sectors $21_1$ to the disk, spiral track $39_2$ is processed initially to generate the PES tracking error and the timing recovery measurement. When the product servo sectors $21_1$ begin to overwrite spiral track $39_2$, spiral track $39_3$ is processed to generate the PES tracking error and the timing recovery measurement. In the embodiment of FIG. 7, the spiral tracks 39 are written as pairs to facilitate the interleave processing; however, the spiral tracks may be written using any suitable spacing (e.g., equal spacing) while still implementing the interleaving aspect. Further description of spiral track technology and the translation of spiral tracks to product servo sectors may be found in co-pending U.S. patent application Ser. No. 11/018,554, entitled "Servo Writing a Disk Drive by Integrating a Spiral Track Read Signal," filed on behalf of Lee et al., the content of which is hereby incorporated by reference in its entirety.

Figure 8:
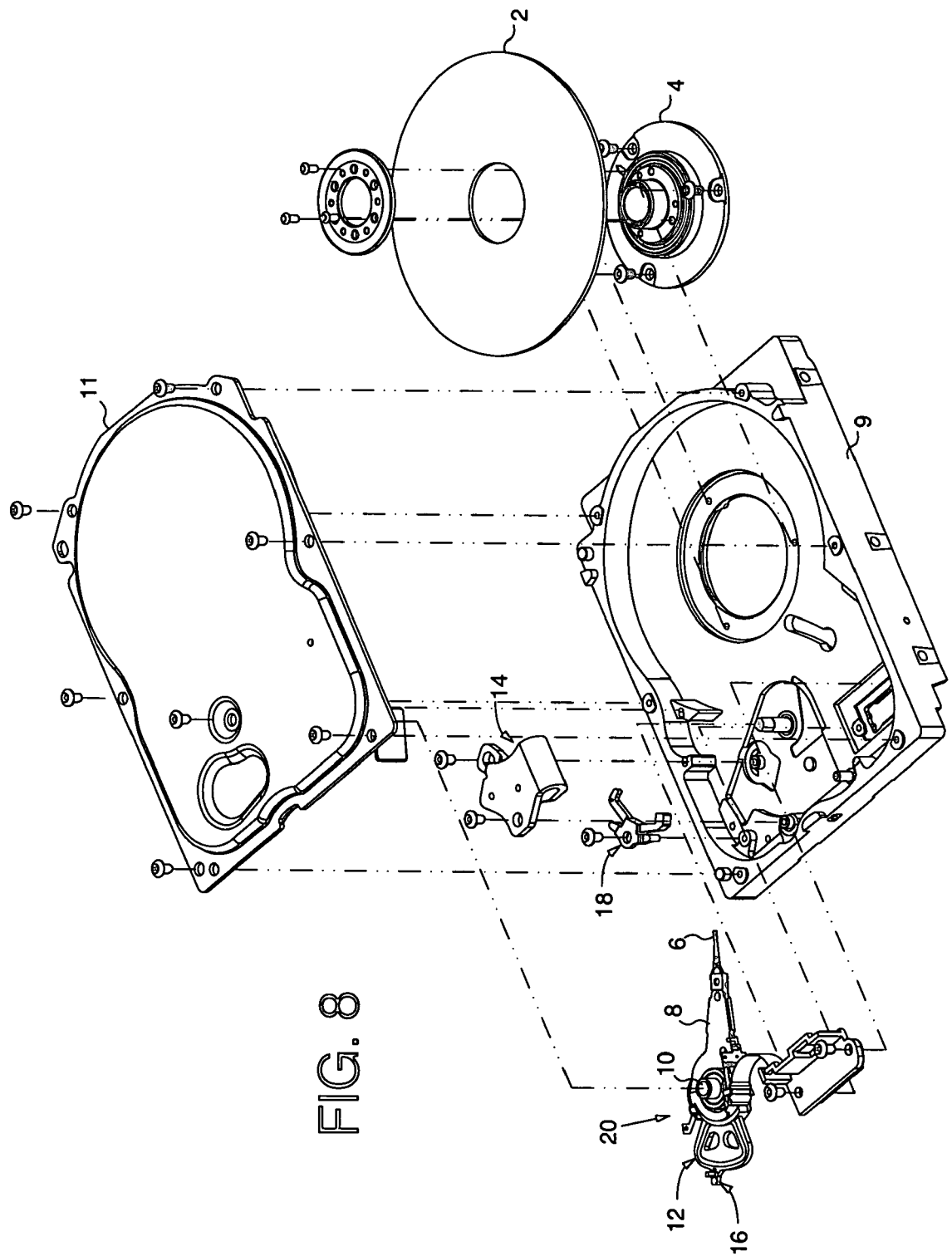
FIG. 8 shows a disk drive according to an embodiment of the present invention wherein the mechanical position sensor comprises an optical sensor.
Figure 9:
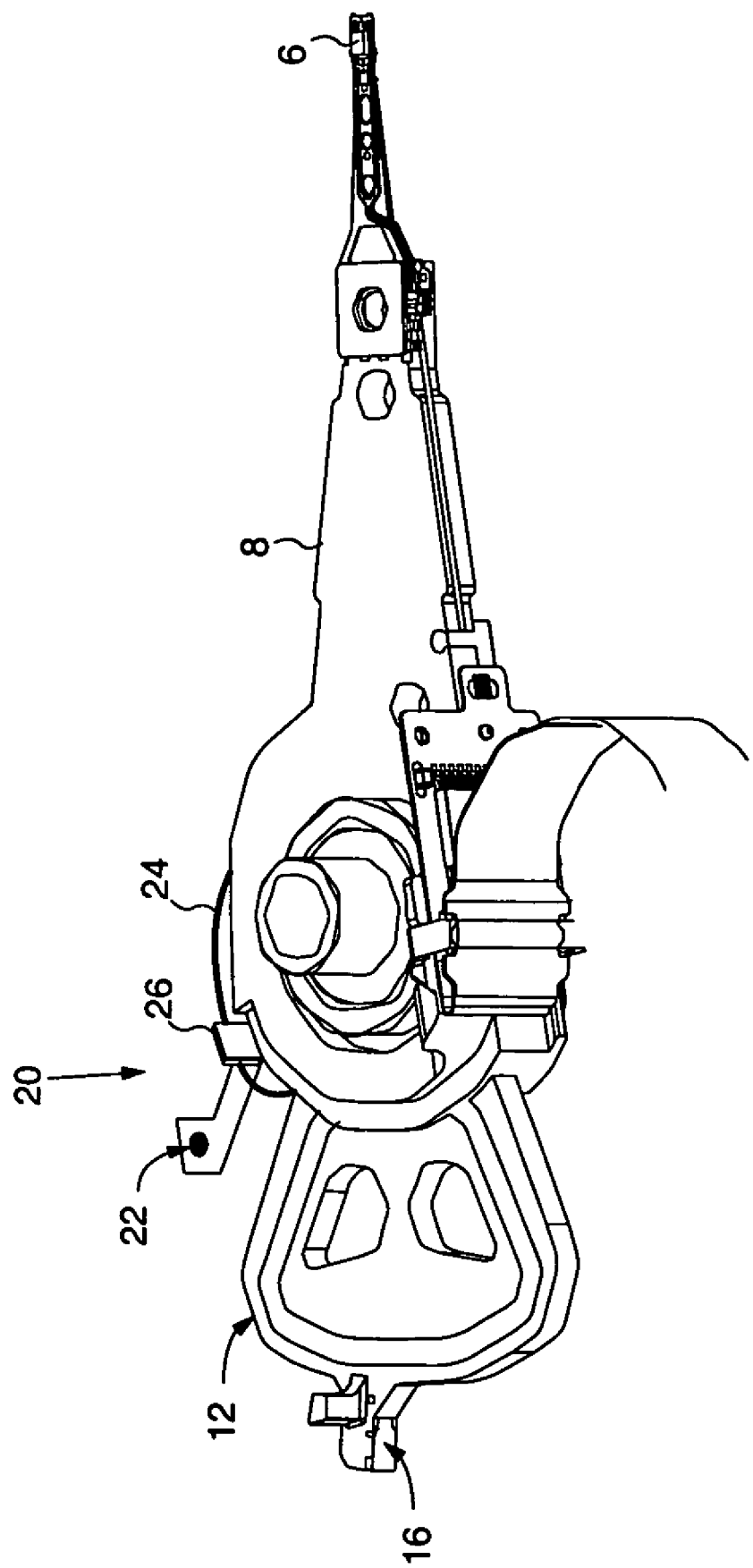
FIG. 9 shows an actuator arm according to an embodiment of the present invention wherein the optical sensor comprises a light source, a plurality of light sensitive sensors, and an opaque element positioned between the light source and the light sensitive sensors.

Any suitable mechanical position sensor 20 may be employed in embodiments of the present invention, such as a Hall effect sensor or a capacitive sensor. FIG. 8 shows a disk drive according to an embodiment of the present invention wherein the mechanical position sensor 20 comprises an optical sensor 20. As illustrated in FIG. 9, the optical sensor 20 comprises a light source 22, a plurality of light sensitive sensors 26 positioned to receive light from the light source 22, and a substantially opaque element 24 positioned between the light source 22 and the light sensitive sensors 26 configured to control an amount of light at least one of the plurality of light sensitive sensors 26 detects relative to the position of the actuator arm 8. The light source 22 comprises a light emitting device, such as a light emitting diode (LED), that is stationary relative to the base 9. The opaque element 24 comprises a linear element, such as a wire, coupled to the actuator arm 8. The light source 22 and light sensitive sensors 26 are aligned substantially horizontally with respect to the surface of the disk 2 (and the planar surface of the actuator arm 8). The light sensitive sensors 26 are stationary relative to the base 9 such that the opaque element 24 moves with the actuator arm 8 relative to the light sensitive sensors 26, thereby changing the amount of light each light sensitive sensor 26 detects.

Figure 10A:
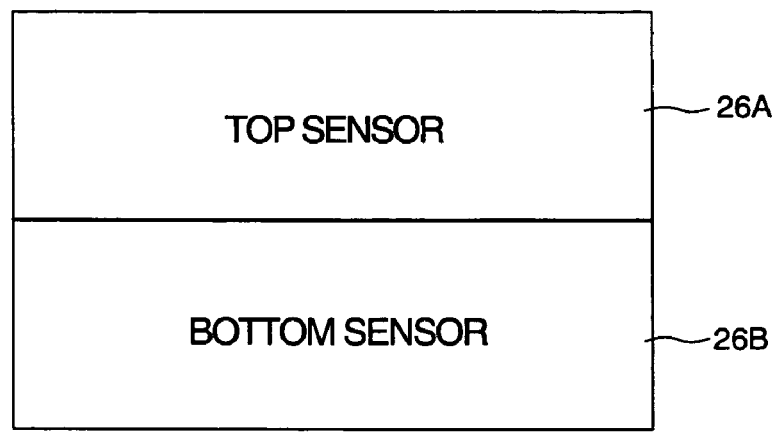
FIG. 10A shows an embodiment of the present invention wherein the plurality of light sensitive sensors comprise top and bottom sensors.

In the embodiment of FIG. 9, the light sensitive sensors 26 comprise a top sensor 26A and a bottom sensor 26B as illustrated in FIG. 10A. Any suitable light sensitive sensor 26 may be employed in the embodiments of the present invention, such as a photo resistor, a charge-coupled device (CCD), a CdS/CdSe photo sensor, or a silicon based photovoltaic cell (photodiode). A light sensitive sensor 26 having a high bandwidth (e.g., a photovoltaic cell) may be preferred depending on the application. The light sensitive sensors 26A and 26B are shown adjacent one another in the embodiment of FIG. 10A, and may be integrated into a single component (e.g., separate regions of a CCD or CdS/CdSe photo sensor). In an alternative embodiment, the light sensitive sensors 26A and 26B may be manufactured as separate components and may also be separated by any suitable distance.

Figure 10B:
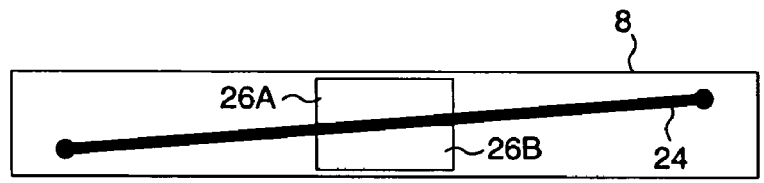
FIGS. 10B-10D illustrate how the opaque element controls the amount of light each sensor detects relative to the position of the actuator arm according to an embodiment of the present invention.
Figure 10C:
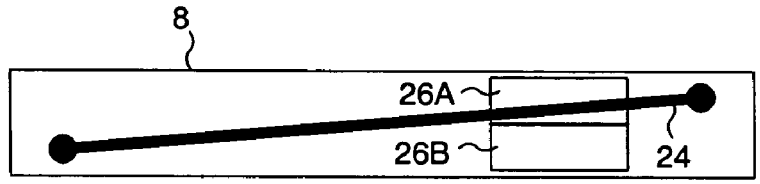
Figure 10D:
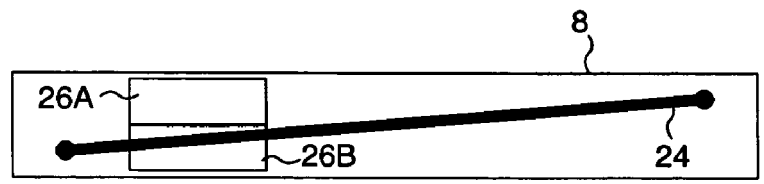

Operation of the optical sensor 20 shown in FIG. 9 is illustrated in FIGS. 10B-10D, which shows a side view of the actuator arm 8 from the perspective of the light emitting device 22 looking toward the light sensitive sensors 26A and 26B. In this embodiment, the opaque element 24 (a linear element) has a sloping angle with respect to the actuator arm 8. In FIG. 10B, the actuator arm 8 is positioned near the middle of its stroke such that each light sensitive sensor 26A and 26B receives an equal amount of light. In FIG. 10C, the actuator arm 8 is rotated in one direction (e.g., toward the OD) such that the bottom sensor 26B receives more light than the top sensor 26A, and in FIG. 10D the actuator arm 8 is rotated in the opposite direction (e.g., toward the ID) such that top sensor 26A receives more light than the bottom sensor 26B.

Although the opaque element 24 is shown in the embodiment of FIG. 9 as comprising a linear element having a sloping angle, the opaque element 24 may comprise any suitable shape, such as a planar shape. In another embodiment, the opaque element 24 may comprise one or more apertures for controlling an amount of light passing through the opaque element 24. In addition, the opaque element 24 may comprise any suitable orientation with respect to the actuator arm 8 and light sensitive sensors 26. For example, the opaque element 24 may be curved rather than linear.

Figure 11A:
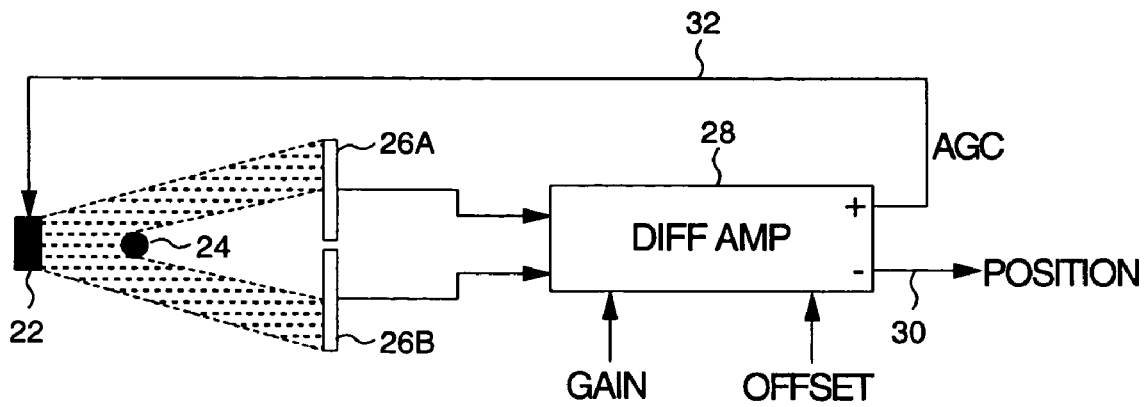
FIG. 11A shows an embodiment of the present invention wherein a differential amplifier computes a difference between the sensor outputs representing the position of the actuator arm, and the sum of the sensor outputs used to control an intensity of the light.

In one embodiment, the output of the light sensitive sensors 26 is used to adjust the intensity of the light emitted by the light source in an automatic gain control (AGC) loop. FIG. 11A shows an embodiment of the present invention wherein a differential amplifier 28 computes a difference between a first amount of light detected by the first sensor 26A and a second amount of light detected by the second sensor 26B, wherein the difference 30 represents the position of the actuator arm 8 and, in turn, the position of the head 6. Also in the embodiment of FIG. 11A, the differential amplifier 28 computes a sum 32 of the first amount of light detected by the first sensor 26A and the second amount of light detected by the second sensor 26B, wherein an intensity of the light emitted by the light source is controlled in response to the sum 32 in an AGC loop. The differential amplifier 28 further comprises a gain setting and an offset setting for adjusting the gain and offset of the optical sensor 20 by adjusting the gain and offset of the differential amplifier 28. This gain and offset correspond to those that may be set during calibration of the sensor 20 in step 65 of FIG. 5A.

Figure 11B:
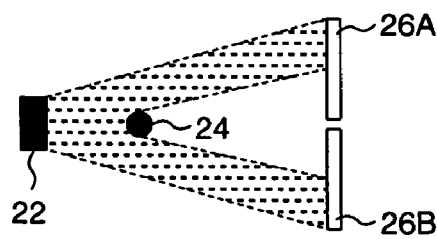
FIGS. 11B-11D illustrate how the amount of light each sensor detects changes relative to the position of the actuator arm according to an embodiment of the present invention.
Figure 11C:
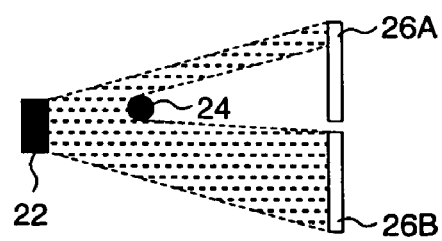
Figure 11D:
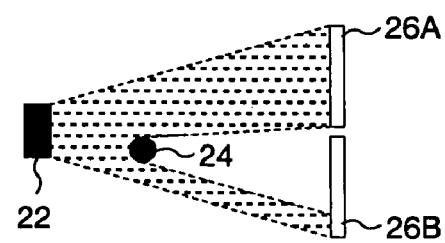

FIGS. 11B-11D correspond to FIGS. 10B-10D and illustrate how the position of the opaque element 24 changes to control the amount of light each light sensitive sensor detects relative to the position of the actuator arm 8. FIG. 11B shows that both light sensitive sensors 26A and 26B receive the same amount of light when the actuator arm 8 is near the middle of its stroke, FIG. 11C shows that bottom sensor 26B receives more light as the actuator arm 8 moves toward the OD, and FIG. 11D shows that the top sensor 26A receives more light as the actuator moves toward the ID. The difference between the amount of light each sensor detects therefore represents the position of the actuator arm 8.

Figure 12A:
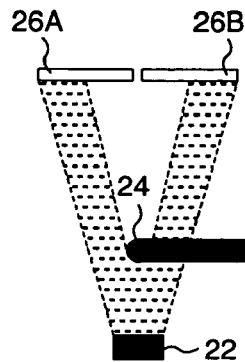
FIGS. 12A-12D illustrate an alternative embodiment of the present invention wherein the light source and light sensitive sensors are aligned vertically with respect to the surface of the disk.
Figure 12B:
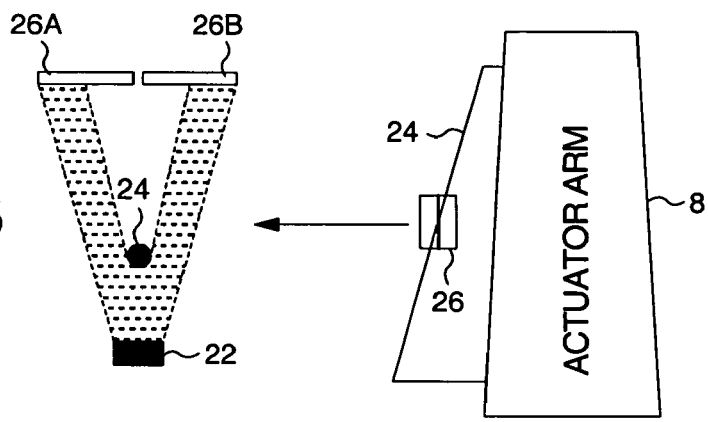
Figure 12C:
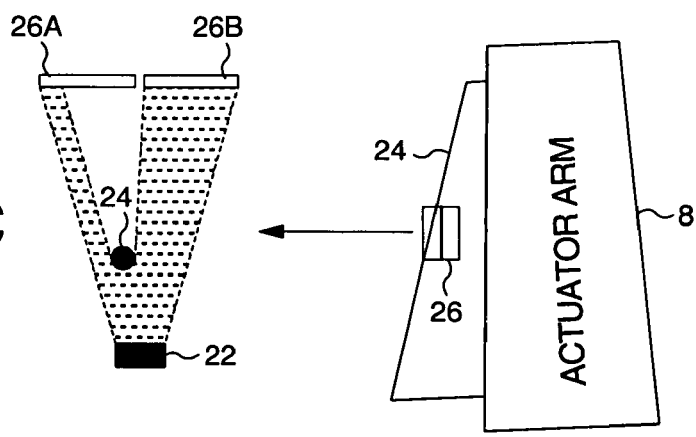
Figure 12D:
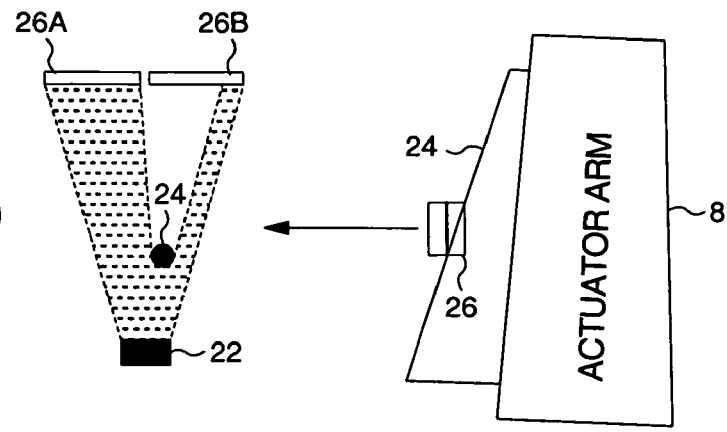

Any suitable configuration for the light source and light sensitive sensors may be employed in embodiments of the present invention. FIG. 12A shows an alternative embodiment of the present invention wherein the light source (e.g., LED 22) and light sensitive sensors 26A and 26B are aligned substantially vertically with respect to the disk 2 (and planar surface of the actuator arm 8). FIGS. 12B-12D illustrate how the amount of light each light sensitive sensor 26A and 26B detects changes with the changing position of the actuator arm 8. FIGS. 12B-12D also illustrate an alternative shape for the opaque element 24; however, any suitable shape may be employed.

Figure 13A:
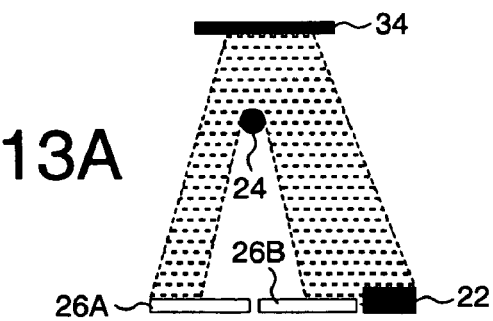
FIG. 13A illustrates an embodiment of the present invention wherein the light source comprises a light emitting device and a mirror.
Figure 13B:
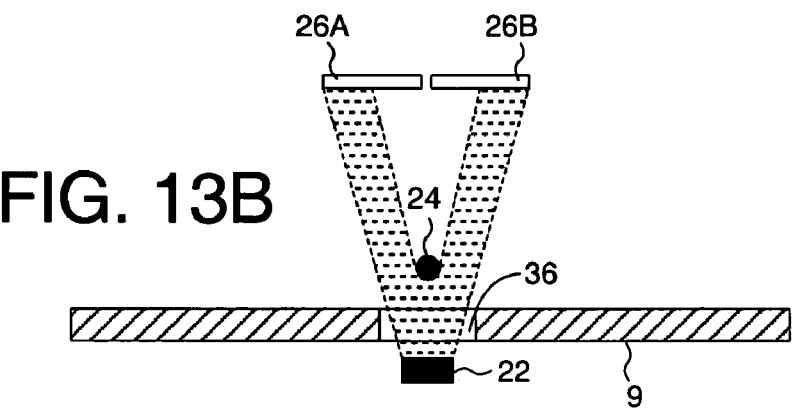
FIG. 13B shows an embodiment of the present invention wherein the HDA comprises a window, wherein the light passes through the window.
Figure 13C:
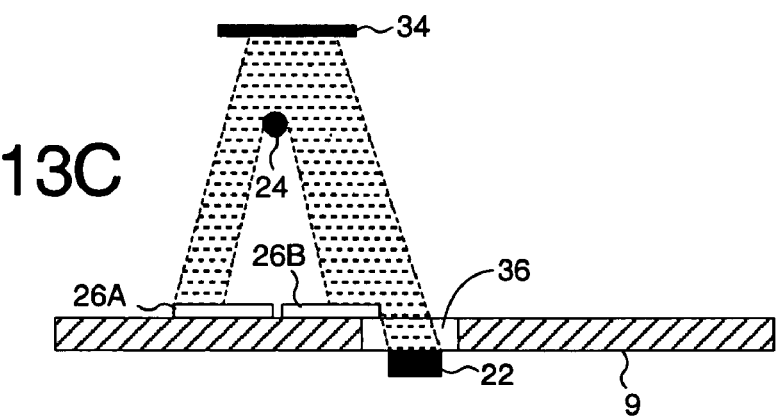
FIG. 13C shows an embodiment of the present invention wherein the light sensitive sensors are located inside the HDA.
Figure 13D:
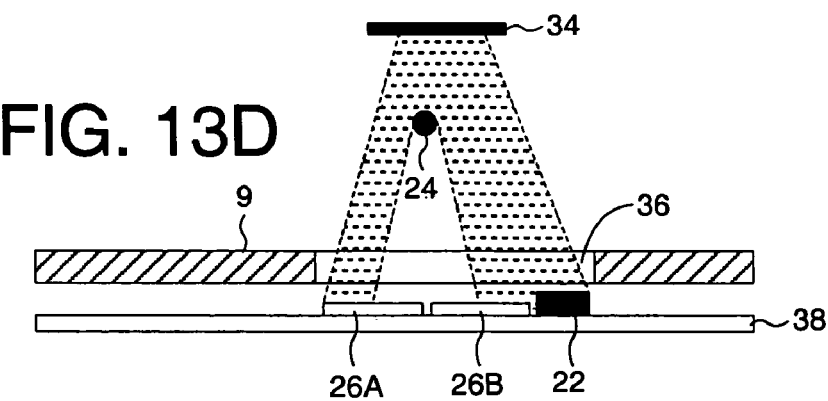
FIG. 13D shows an embodiment of the present invention wherein the light source and light sensitive sensors are mounted on a printed circuit board outside the HDA.

FIG. 13A illustrates another alternative configuration for the light source and light sensitive sensors. In this embodiment, the light source comprises a light emitting device 22 (e.g., an LED) and a mirror 34 for reflecting the light toward the light sensitive sensors 26A and 26B. FIG. 13B shows yet another configuration wherein the base 9 of the HDA comprises a window 36, and the light emitted by the light emitting device 22 passes through the window 36. This allows the light emitting device 22 to be located outside of the HDA. FIG. 13C shows an embodiment employing the mirror 34 of FIG. 13A and the window 36 of FIG. 13B, wherein the light sensitive sensors 26A and 26B are located inside the HDA. FIG. 13D shows an embodiment wherein both the light emitting device 22 and the light sensitive sensors 26A and 26B are mounted on a printed circuit board 38 located outside the HDA. In this embodiment, the light passes through the window 36, reflects off of the mirror 34, and then passes back through the window 36.

Figure 14:
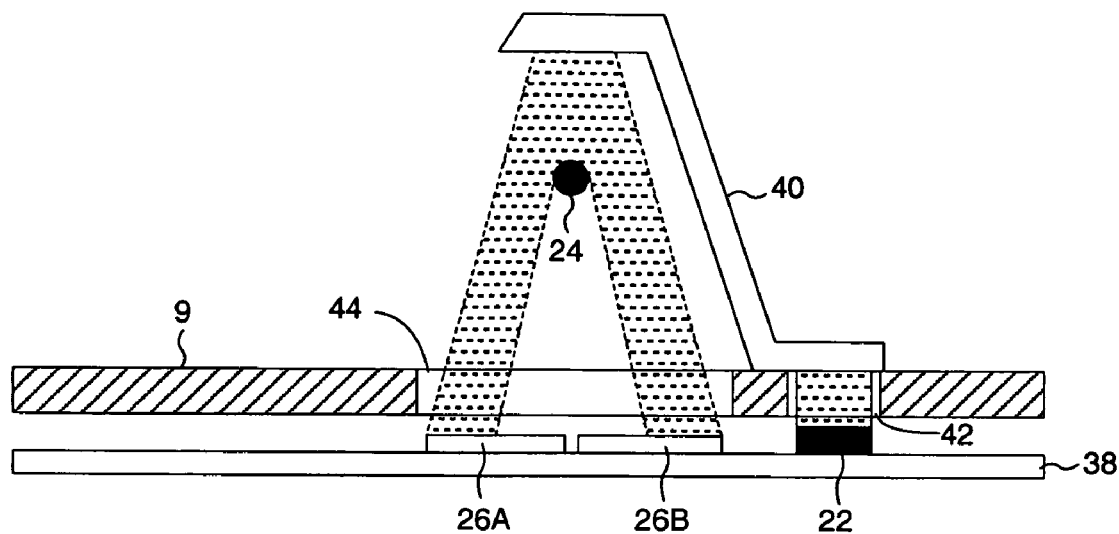
FIG. 14 shows an embodiment of the present invention wherein the light source comprises a light pipe, and the HDA comprises two windows.

FIG. 14 shows yet another embodiment of the present invention wherein the light source comprises a light emitting device 22 and a suitable light pipe 40 (e.g., a fiber optic). The light emitted by the light emitting device 22 passes through a first window 42 in the base 9 of the HDA, and is directed from one end of the light pipe 40 to the other end. The light then shines toward the light sensitive sensors 26A and 26B with appropriate shading by the opaque element 24. In this embodiment, the light passes through a second window 44 in the HDA before reaching the light sensitive sensors 26A and 26B located outside of the HDA.

Figure 15A:
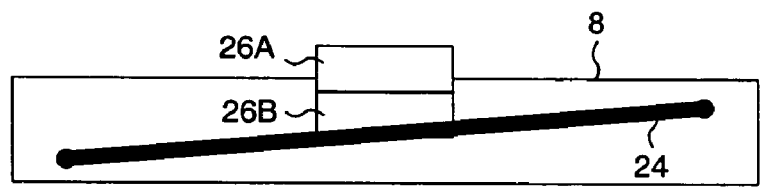
FIGS. 15A-15C illustrate an alternative embodiment of the present invention wherein the opaque element controls an amount of light one of the light sensitive sensors detects.
Figure 15B:
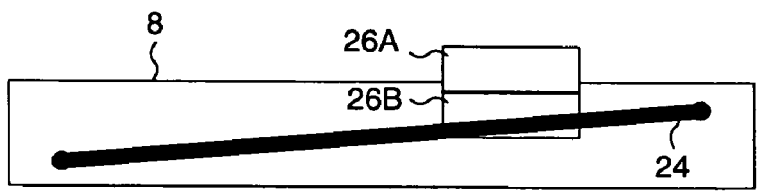
Figure 15C:
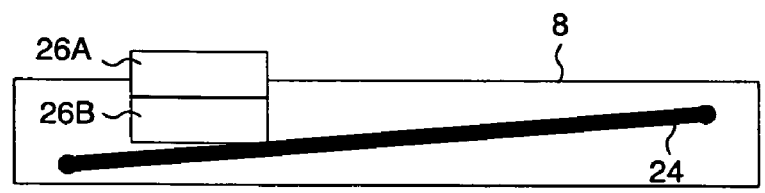

FIGS. 15A-15C illustrate another embodiment of the present invention wherein the opaque element 24 is configured to control the amount of light received only by the bottom sensor 26B. When the actuator arm 8 is near the middle of its stroke, as shown in FIG. 15A, the opaque element covers a predetermined area of the bottom sensor 26B. As the actuator arm 8 rotates toward the OD as shown in FIG. 15B, more of the opaque element 24 covers the bottom sensor 26B, and as the actuator arm 8 rotates toward the ID as shown in FIG. 15C, less of the opaque element 24 covers the bottom sensor 26B. In this embodiment, the output from both light sensitive sensors 26A and 26B may be used to control the intensity of the light in an AGC loop, for example, using the differential amplifier 28 shown in FIG. 11A.

I claim:

1. A disk drive comprising:
a head disk assembly (HDA) comprising a base and a cover for enclosing:
  a disk;
  an actuator arm;
  a head attached to a distal end of the actuator arm;

a mechanical position sensor operable to generate a position signal representing a position of the head relative to the disk; and a voice coil motor for rotating the actuator arm about a pivot; and the disk drive further comprising control circuitry operable to:

rotate the disk at a predetermined velocity;

generate a control signal in response to the position signal generated by the mechanical position sensor;

apply the control signal to the voice coil motor in order to seek the head radially over the disk while writing a spiral track to the disk; and process the spiral track to maintain the head along a servo track while writing product servo sectors along the servo track.

2. The disk drive as recited in claim 1, wherein the control circuitry is further operable to write a plurality of spiral tracks to the disk by seeking the head radially over the disk a number of times and writing one of the spiral tracks during each seek.

3. The disk drive as recited in claim 1, wherein:
(a) the disk comprises a clock track for synchronizing a write clock; and
(b) the control circuitry is operable to process the write clock while writing the spiral track to the disk.

4. The disk drive as recited in claim 3, wherein the disk drive further comprises a clock head for reading the clock track to synchronize the write clock.

5. The disk drive as recited in claim 1, wherein
(a) the disk further comprises a first plurality of reference tracks written at an outer diameter of the disk and a second plurality of reference tracks written at an inner diameter of the disk; and
(b) the control circuitry is further operable to calibrate the mechanical position sensor by reading at least one of the first and second plurality of reference tracks.

6. The disk drive as recited in claim 5, wherein the control circuitry is further operable to calibrate at least one of a gain and an offset of the mechanical position sensor by reading the at least one of the first and second plurality of reference tracks.

7. The disk drive as recited in claim 6, wherein the control circuitry is further operable to determine a reference position representing a radial position of at least one of the first and second plurality of reference tracks.

8. The disk drive as recited in claim 6, wherein the control circuitry is further operable to seek the head from a first diameter of the disk to a second diameter of the disk while writing the spiral track by:
(a) positioning the head near the first diameter of the disk;
(b) verifying the position of the head by reading at least one of the first and second plurality of reference tracks; and
(c) seeking the head toward the second diameter of the disk.

9. The disk drive as recited in claim 8, wherein the control circuitry is further operable to:
(a) seek the head toward the second diameter of the disk in response to a predetermined velocity seek profile; and
(b) calibrate at least one of the gain and offset of the mechanical position sensor by reading at least one of the first and second plurality of reference tracks after seeking the head toward the second diameter of the disk.

10. The disk drive as recited in claim 1, wherein the spiral track comprises a high frequency signal interrupted at a periodic interval by a sync mark.

11. The disk drive as recited in claim 1, wherein the mechanical position sensor comprises an optical sensor.

12. A method of servo writing a disk drive, the disk drive comprising a head disk assembly (HDA) comprising a base and a cover for enclosing a disk, an actuator arm, a head attached to a distal end of the actuator arm, a mechanical position sensor operable to generate a position signal relative to a position of the actuator arm, and a voice coil motor for rotating the actuator arm about a pivot, the method comprising the steps of:

rotating the disk at a predetermined velocity;

generating a control signal in response to the position signal generated by the mechanical position sensor;

applying the control signal to the voice coil motor in order to seek the head radially over the disk while writing a spiral track to the disk; and processing the spiral track to maintain the head along a servo track while writing product servo sectors along the servo track.

13. The method as recited in claim 12, further comprising the step of writing a plurality of spiral tracks to the disk by seeking the head radially over the disk a number of times and writing one of the spiral tracks during each seek.

14. The method as recited in claim 12, wherein the disk comprises a clock track for synchronizing a write clock, further comprising the step of processing the write clock while writing the spiral track to the disk.

15. The method as recited in claim 14, wherein the disk drive further comprises a clock head for reading the clock track to synchronize the write clock.

16. The method as recited in claim 12, wherein the disk further comprises a first plurality of reference tracks written at an outer diameter of the disk and a second plurality of reference tracks written at an inner diameter of the disk, further comprising the step of calibrating the mechanical position sensor by reading at least one of the first and second plurality of reference tracks.

17. The method as recited in claim 16, wherein the step of calibrating the mechanical position sensor comprises the step of calibrating at least one of a gain and an offset of the mechanical position sensor by reading at least one of the first and second plurality of reference tracks.

18. The method as recited in claim 17, wherein the step of calibrating the mechanical position sensor comprises the step of determining a reference position representing a radial position of at least one of the first and second plurality of reference tracks.

19. The method as recited in claim 17, wherein the step of applying the control signal to the voice coil motor in order to seek the head radially over the disk while writing the spiral track to the disk comprises the steps of:

positioning the head near a first diameter of the disk;

verifying the position of the head by reading at least one of the first and second plurality of reference tracks; and seeking the head toward a second diameter of the disk.

20. The method as recited in claim 19, wherein the step of seeking the head toward the second diameter of the disk comprises the step of seeking the head toward the second diameter of the disk in response to a predetermined velocity seek profile, the method further comprising the step of calibrating at least one of the gain and offset of the mechanical position sensor by reading at least one of the first and second plurality of reference tracks after seeking the head toward the second diameter of the disk.

21. The method as recited in claim 12, wherein the spiral track comprises a high frequency signal interrupted at a periodic interval by a sync mark.

22. The method as recited in claim 12, wherein the mechanical position sensor comprises an optical sensor.

* * * * *